(12) United States Patent
Kurozumi et al.

(10) Patent No.: US 8,179,514 B2
(45) Date of Patent: May 15, 2012

(54) LIQUID CRYSTAL DISPLAY DEVICE WITH FIRST AND SECOND PROTRUDING WALLS SURROUNDING SPHERICAL SPACERS

(75) Inventors: Yukio Kurozumi, Mie (JP); Makoto Kanbe, Nara (JP); Yoshitaka Hibino, Mie (JP); Yasuo Minami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 692 days.

(21) Appl. No.: 12/306,941

(22) PCT Filed: Jun. 6, 2007

(86) PCT No.: PCT/JP2007/061463
§ 371 (c)(1),
(2), (4) Date: Dec. 30, 2008

(87) PCT Pub. No.: WO2008/044364
PCT Pub. Date: Apr. 17, 2008

(65) Prior Publication Data
US 2009/0279041 A1  Nov. 12, 2009

(30) Foreign Application Priority Data

Oct. 5, 2006  (JP) ................. 2006-274367

(51) Int. Cl.
*G02F 1/1339* (2006.01)
(52) U.S. Cl. .................. 349/155; 349/156; 349/157
(58) Field of Classification Search ........... 349/155–157
See application file for complete search history.

(56) References Cited

U.S. PATENT DOCUMENTS

| | | | |
|---|---|---|---|
| 5,459,598 A * | 10/1995 | Carrington | 349/156 |
| 6,433,852 B1 | 8/2002 | Sonoda et al. | |
| 7,508,481 B2 | 3/2009 | Whitehead, Jr. et al. | |
| 7,570,338 B2 | 8/2009 | Yoon et al. | |
| 7,659,960 B2 | 2/2010 | Doi et al. | |
| 2002/0191141 A1* | 12/2002 | Liao | 349/155 |

(Continued)

FOREIGN PATENT DOCUMENTS

| | | |
|---|---|---|
| JP | 2005-258137 | 9/2005 |
| WO | 2008/032481 A1 | 3/2008 |

OTHER PUBLICATIONS

U.S. Appl. No. 12/440,907, filed Mar. 11, 2009, entitled "Liquid Crystal Display Device". This application is the national phase application of WO 2008/032481.

(Continued)

*Primary Examiner* — Jessica M Merlin
(74) *Attorney, Agent, or Firm* — Nixon & Vanderhye P.C.

(57) ABSTRACT

A liquid crystal display device (50a) includes: an active matrix substrate (20a) having a plurality of gate lines (1a) extending in parallel with each other; a counter substrate (30a) provided so as to face the active matrix substrate (20a); a liquid crystal layer (25) provided between the active matrix substrate (20a) and the counter substrate (30a); and spherical spacers (21) provided between the active matrix substrate (20a) and the counter substrate (30a) so as to overlap each gate line (1a), for defining a thickness of the liquid crystal layer (25). A first protruding wall (9a) for surrounding the spacers (21) is provided over each gate layer (1a) of the active matrix substrate (20a), and a second protruding wall (19b) for surrounding the spacers (21) is provided on the counter substrate (30a).

15 Claims, 6 Drawing Sheets

U.S. PATENT DOCUMENTS

| | | | |
|---|---|---|---|
| 2004/0114090 A1* | 6/2004 | Washizawa et al. | 349/158 |
| 2005/0122464 A1 | 6/2005 | Lu | |
| 2006/0044499 A1* | 3/2006 | Sugiura et al. | 349/123 |
| 2006/0066766 A1* | 3/2006 | Tanaka et al. | 349/44 |
| 2006/0181667 A1 | 8/2006 | Doi et al. | |
| 2006/0281211 A1* | 12/2006 | Yoon et al. | 438/34 |
| 2006/0285062 A1* | 12/2006 | Kim et al. | 349/156 |

OTHER PUBLICATIONS

International Search Report for PCT/JP2007/061463, mailed Jul. 17, 2007.

Office Action of U.S. Appl. No. 12/440,907 mailed Jul. 13, 2011; Kurozumi.

* cited by examiner

LIQUID CRYSTAL DISPLAY DEVICE WITH FIRST AND SECOND PROTRUDING WALLS SURROUNDING SPHERICAL SPACERS

This application is the U.S. national phase of International Application No. PCT/JP2007/061463, filed 6 Jun. 2007 which designated the U.S. and claims priority to Japan Application No. 2006-274367, filed 5 Oct. 2006, the entire contents of each of which are hereby incorporated by reference.

TECHNICAL FIELD

The present invention generally relates to a liquid crystal display device. More particularly, the present invention relates to a liquid crystal display device that is manufactured by placing spherical spacers between a pair of substrates provided so as to face each other.

BACKGROUND ART

Liquid crystal display devices have been widely used in cellular phones and liquid crystal televisions because of their thin thickness and low power consumption. Especially, an active matrix driving liquid crystal display device including a switching element at every pixel which is a minimum unit of an image can reliably turn on each pixel and therefore can provide high definition moving picture display.

The active matrix driving liquid crystal display device is formed by components such as a liquid crystal display panel having an active matrix substrate including, for example, a thin film transistor (hereinafter, referred to as "TFT") in every pixel as a switching element, a counter substrate provided so as to face the active matrix substrate and including a color filter, and a liquid crystal layer provided between these substrates. The thickness of the liquid crystal layer, that is, the cell thickness, is defined by a spacer held between the active matrix substrate and the counter substrate.

For example, Patent document 1 discloses a liquid crystal display panel using spherical bead spacers as a spacer defining the cell thickness. In this liquid crystal display panel, a protruding partition wall for preventing the bead spacers from moving into pixels is formed at the boundary between each pixel and a black matrix on a substrate on which the beads spacers are arranged. Patent document 1 describes that this structure can suppress defective display due to light leakage and abnormal orientation caused by movement of the bead spacers.

Patent document 1: Japanese Laid-Open Patent Publication No. 2005-258137

DISCLOSURE OF THE INVENTION

Problems to be Solved by the Invention

In the manufacturing technology of liquid crystal display devices, it has been considered to provide such spherical spacers at a predetermined position of one substrate of a liquid crystal display device by an inkjet method.

FIG. 13 is a schematic cross-sectional view showing a conventional liquid crystal display device 150 having spherical spacers provided by an inkjet method.

In this liquid crystal display device 150, as shown in FIG. 13, spherical spacers 121 are provided by an inkjet method on a seat formed by gate lines 111a or the like on an active matrix substrate 120. For example, the spacers 121 may drop from the gate lines (seats) 111a due to vibration during transportation after completion of manufacturing. In this case, the cell thickness is reduced in a region where the spacers 121 have dropped, resulting in uneven cell thickness. The display quality of the liquid crystal display device 150 is therefore significantly degraded. Note that, in FIG. 13, 110a and 110a indicate a substrate body, and 116b indicates a black matrix.

In a liquid crystal display device in which the partition walls disclosed in Patent document 1 are formed in a region where spacers are provided, two partition walls extending in parallel with each other suppress movement of the spacers along the width direction of the partition walls when vibration is applied to the liquid crystal display device, However, the partition walls do not suppress movement of the spacers in the length direction of the partition walls. The spacers may therefore move along the length direction between the two partition walls and gather at the ends of the partition walls, resulting in an uneven cell thickness. Especially a large screen liquid crystal display device has long partition walls and a large number of spacers are provided between the partition walls. Accordingly, such an uneven thickness is a greater concern for large screen liquid crystal display devices.

The present invention is made in view of the above problems and it is an object of the present invention to suppress non-uniformity in cell thickness by reliably providing spherical spacers at a predetermined position between substrates.

Means for Solving the Problems

In order to achieve the above object, in the present invention, a first protruding wall for surrounding spherical spacers is provided over each display line of an active matrix substrate and a second protruding wall for surrounding the spherical spacers is provided on a counter substrate.

More specifically, a liquid crystal display device according to the present invention includes: an active matrix substrate having a plurality of display lines extending in parallel with each other; a counter substrate provided so as to face the active matrix substrate; a liquid crystal layer provided between the active matrix substrate and the counter substrate; and spherical spacers provided between the active matrix substrate and the counter substrate so as to overlap each display line, for defining a thickness of the liquid crystal layer. A first protruding wall for surrounding the spacers is provided over each display line of the active matrix substrate, and a second protruding wall for surrounding the spacers is provided on the counter substrate.

According to the above structure, the spherical spacers provided between the active matrix substrate and the counter substrate are surrounded by the first protruding wall formed over each display line of the active matrix substrate and the second protruding wall formed on the counter substrate. This structure can prevent the spherical spacers from dropping from the display lines of the active matrix substrate even if vibration is applied to the liquid crystal display device. Moreover, since the spherical spacers are provided in a region surrounded by the first protruding wall formed over each display line of the active matrix substrate and the second protruding wall formed on the counter substrate, the spherical spacers can be reliably provided at a predetermined position between the active matrix substrate and the counter substrate, whereby the thickness of the liquid crystal layer is held at a predetermined value. The spherical spacers can thus be reliably provided at a predetermined position between the substrates, and non-uniformity of the cell thickness can be suppressed.

The first protruding wall and the second protruding wall may overlap each other so as to surround the spacers.

According to the above structure, the first protruding wall and the second protruding wall are provided so as to overlap each other. Therefore, the first protruding wall and the second protruding wall have the same shape so as to surround the spacers. Since movement of the spacers can be restrained by respective inner peripheral walls of the first protruding wall and the second protruding wall, the spacers can be reliably arranged at a predetermined position between the active matrix substrate and the counter substrate.

The first protruding wall and the second protruding wall may be provided so as to surround the spacers without overlapping each other.

According to the above structure, the first protruding wall and the second protruding wall does not overlap each other. The first protruding wall is thus continuously provided when viewed two-dimensionally so as to surround the spacers through the second protruding wall. Movement of the spacers is therefore restrained by an inner wall of at least one of the first protruding wall and the second protruding wall, whereby the spacers can be reliably provided at a predetermined position between the active matrix substrate and the counter substrate.

The liquid crystal display device may further include a plurality of pixels arranged in a matrix pattern. Each of the display lines may extend between the pixels, and the first protruding wall and the second protruding wall may be provided in every pixel.

According to the above structure, the first protruding wall and the second protruding wall are provided in every pixel. The thickness of the liquid crystal layer is therefore held at a predetermined value in every pixel, and non-uniformity of the cell thickness can further be suppressed.

Each of the display lines may have a wider width in a region where the spacers are provided.

According to the above structure, each display line has a wider width in a region where the spacers are provided, and the first protruding wall (and the second protruding wall) for surrounding the spacers is therefore formed with a larger size. Accordingly, the spacers can be easily provided inside the first protruding wall (and the second protruding wall).

The spacers may be provided by an inkjet method.

According to the above structure, each display line has a wider width in a region where the spacers are provided, and the first protruding wall for surrounding the spacers is therefore formed with a larger size. Accordingly, each spacer can be more reliably provided inside the first protruding wall (and the second protruding wall) by the inkjet method.

The display lines may be gate lines, and the liquid crystal display device may further include a plurality of source lines extending in parallel with each other in such a direction that crosses the gate lines. A thin film transistor may be provided at each intersection of the gate lines and the source lines, and the first protruding wall may include at least one of a metal layer that forms the source lines and a semiconductor layer that forms the thin film transistors.

According to the above structure, the first protruding wall is made of at least one of the metal layer that forms the source lines and the semiconductor layer that forms the thin film transistors. The first protruding wall can therefore be formed on each display line of the active matrix substrate without adding any manufacturing steps.

Projections serving as an alignment center of the liquid crystal layer may be provided in the counter substrate, and the second protruding wall may be made of a material that forms the projections.

According to the above structure, the second protruding wall is made of the material that forms the projections. The second protruding wall can therefore be formed in the counter substrate without adding any manufacturing steps.

The first protruding wall and the second protruding wall may include a movement restraining portion for restraining movement of the spacers and a material inlet/outlet portion for introducing and discharging a liquid material.

According to the above structure, the first protruding wall and the second protruding wall include the material inlet/outlet portion for introducing and discharging the liquid material. The liquid material is therefore spread to the first protruding wall, the second protruding wall, and a region around the first and second protruding walls through the material inlet/outlet portion.

The material inlet/outlet portion may have a lower height than that of the movement restraining portion.

According to the above structure, the liquid material is spread to the first protruding wall, the second protruding wall, and the region around the first and second protruding walls through the material inlet/outlet portion having a lower height than that of the movement restraining portion.

The material inlet/outlet portion may be a notch portion formed along a circumferential direction of each protruding wall.

According to the above structure, the liquid material is spread to the first protruding wall, the second protruding wall, and the region around the first and second protruding walls through the respective notch portions of the first protruding wall and the second protruding wall. In the case where the first protruding wall and the second protruding wall are conductive, short-circuit generated through the first protruding wall and the second protruding wall is suppressed by each notch portion.

The material inlet/outlet portion may be a material inlet/outlet path formed by bending or protruding of the movement restraining portion.

According to the above structure, the liquid material is spread to the first protruding wall, the second protruding wall, and the region around the first and second protruding walls through the material inlet/outlet path formed by the movement restraining portion.

The liquid material may be an alignment-film forming resin that is supplied by an inkjet method in order to form an alignment film on respective surfaces of the active matrix substrate and the counter substrate.

According to the above structure, for example, the alignment-film forming resin such as a polyimide resin is spread to the first protruding wall, the second protruding wall, and the region around the first and second protruding walls through the material inlet/outlet portion.

The liquid material may be a liquid crystal material that forms the liquid crystal layer.

According to the above structure, the liquid crystal material supplied to the surface of the active matrix substrate or the counter substrate is spread to the first protruding wall, the second protruding wall, and the region around the first and second protruding walls through the material inlet/outlet portion.

At least one of the first protruding wall and the second protruding wall may have an inner wall surface standing perpendicularly to a substrate surface and an outer wall surface tilted toward the inner wall surface from the substrate surface side.

According to the above structure, the inner wall surface of at least one of the first protruding wall and the second protruding wall stands perpendicularly to the substrate surface. The spherical spacers are therefore less likely to flow over the protruding wall. Movement of the spacers to the outside of the protruding wall can thus be restrained. Moreover, since the outer wall surface of at least one of the first protruding wall and the second protruding wall is tilted (tapered) toward the inner wall surface from the substrate surface side, the liquid material is more likely to flow into the inside of the protruding wall over the protruding wall.

Effects of the Invention

According to the present invention, a first protruding wall for surrounding spherical spacers is provided over each display line of an active matrix substrate, and a second protruding wall for surrounding the spherical spacers is provided on a counter substrate. The spherical spacers can therefore be reliably provided at a predetermined position between the substrates, whereby non-uniformity of the cell thickness can be reduced.

DESCRIPTION OF THE REFERENCE NUMERALS

Figure 1:
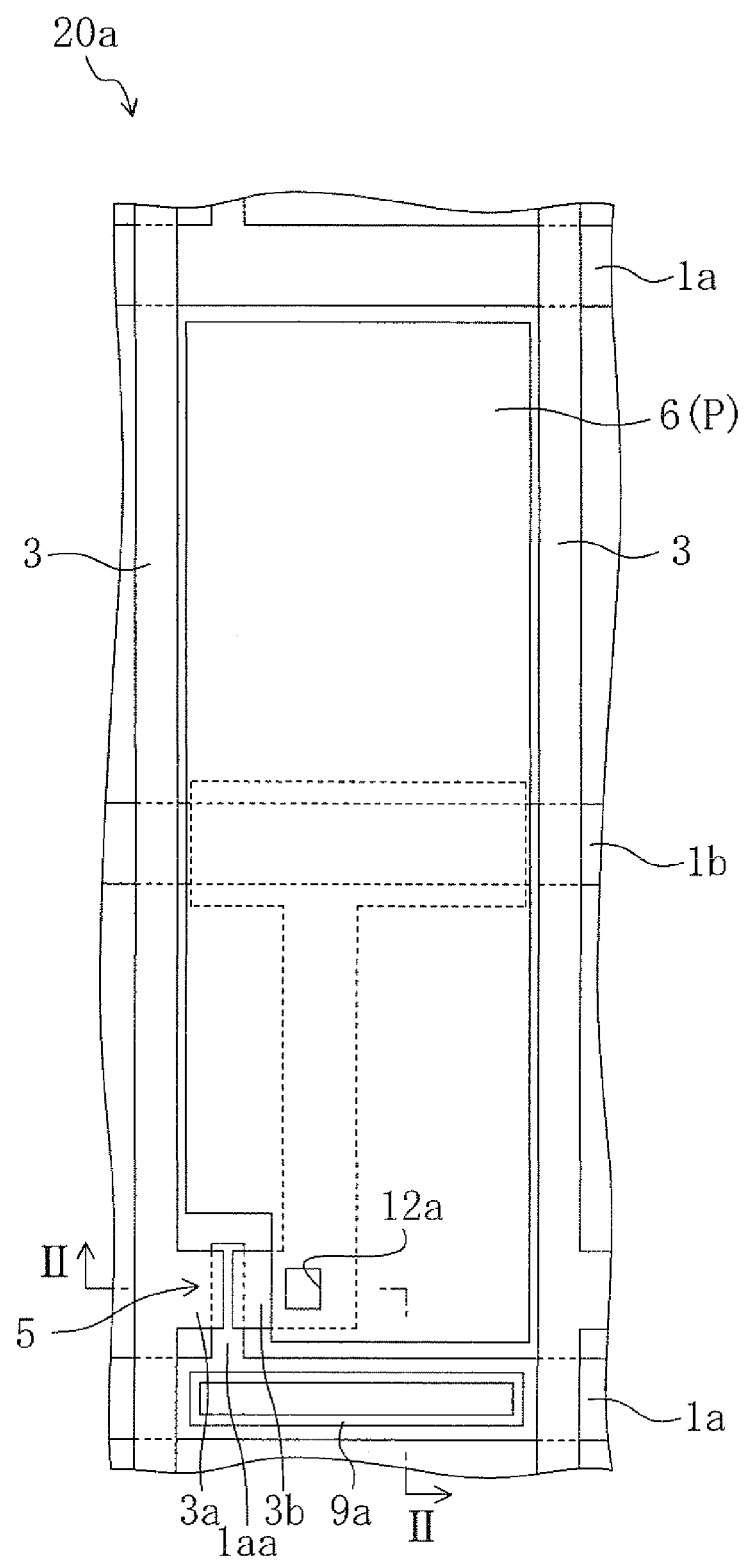
FIG. 1 is a schematic plan view showing an active matrix substrate 20a according to a first embodiment.

C notch portion (material inlet/outlet portion)
L, L1, L2 material inlet/outlet path
1a pixel
T thinned portion (material inlet/outlet portion)
1a gate line (display line)
1b capacitor line (display line)
2a, 2b semiconductor layer
3 source line (display line)
3c source metal layer
5 TFT (thin film transistor)
9a-9h first protruding wall (movement restraining portion)
18a alignment film 19a projection
19b, 19c second protruding wall
20a, 20b active matrix substrate
21 spacer
25 liquid crystal layer
30a, 30b counter substrate
50a, 50b liquid crystal display device

BEST MODE FOR CARRYING OUT THE INVENTION

Hereinafter, embodiments of the present invention will be described in detail with reference to the accompanying drawings. Note that the present invention is not limited to the following embodiments.

(First Embodiment)

Figure 2:
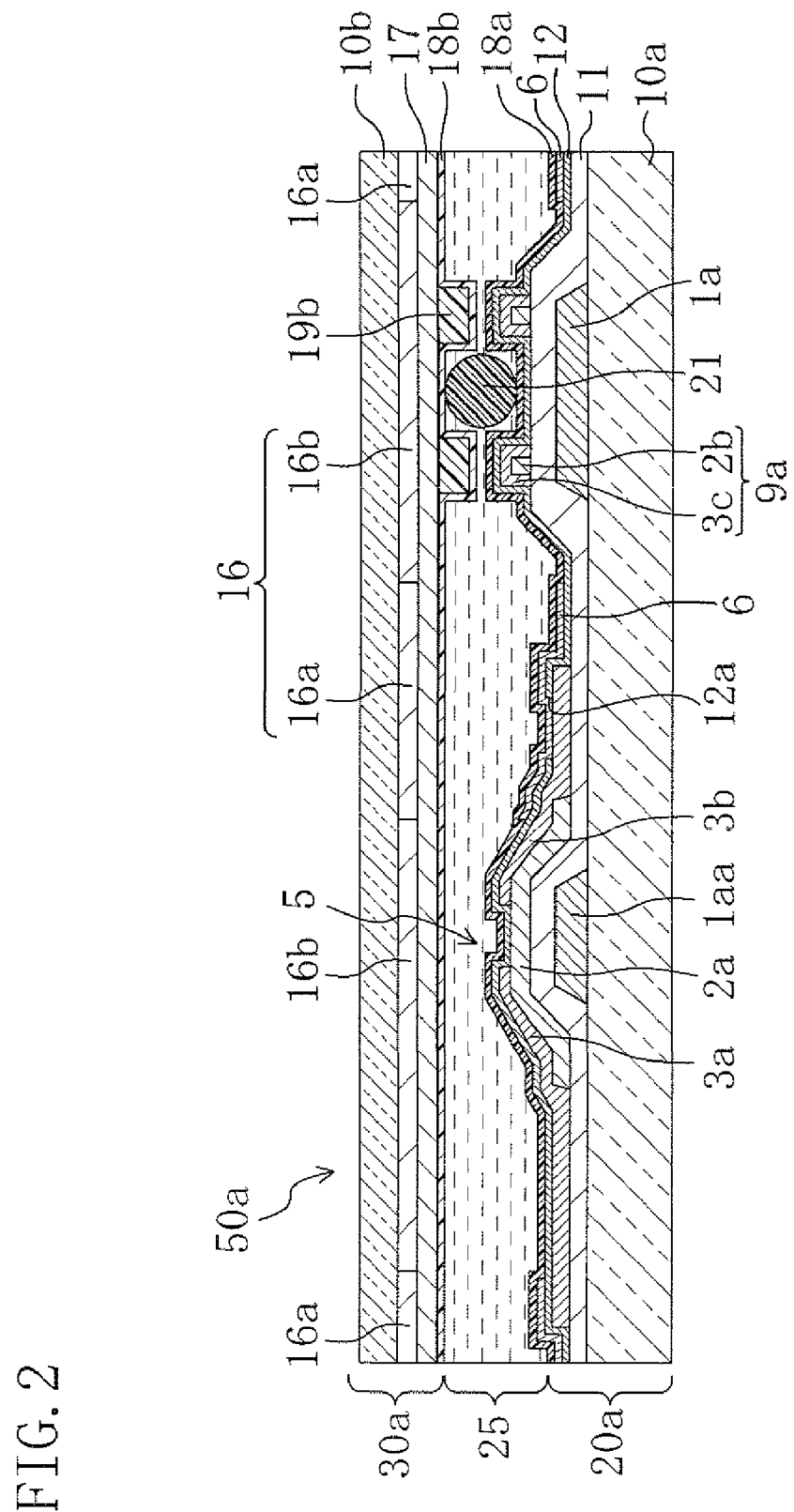
FIG. 2 is a schematic cross-sectional view showing a liquid crystal display device 50a taken along line I-II in FIG. 1.

FIGS. 1 and 2 show a first embodiment of a liquid crystal display device of the present invention. More specifically, FIG. 1 is a schematic plan view showing an active matrix substrate 20a of the liquid crystal display device of the present embodiment, and FIG. 2 is a schematic cross-sectional view showing the liquid crystal display device 50a of the present embodiment taken along line II-II in FIG. 1.

As shown in FIG. 2, the liquid crystal display device 50a includes an active matrix substrate 20a and a counter substrate 30a which are arranged so as to face each other, a vertical alignment type liquid crystal layer 25 provided between the active matrix substrate 20a and the counter substrate 30a, and spherical spacers 21 provided between the active matrix substrate 20a and the counter substrate 30a for defining the thickness of the liquid crystal layer 25.

As shown in FIG. 1, the active matrix substrate 20a includes a plurality of gate lines 1a extending in parallel with each other in the transverse direction in the figure, a plurality of source lines 3 extending in parallel with each other in the longitudinal direction in the figure in such a direction that crosses the gate lines 1a at right angles, thin film transistors (TFTs) 5 provided at respective intersections of the gate lines 1a and the source lines 3, capacitor lines 1b each extending between the gate lines 1a, pixel electrodes 6 each provided corresponding to the respective TFT 5 in a region surrounded by a pair of adjacent gate lines 1a and a pair of adjacent source lines 3, and first protruding walls 9a each provided in a rectangular frame shape so as to surround a spacer 21 on each gate line 1a. Each of the first protruding walls 9a is a movement restraining portion for restraining (limiting) movement of the spacer 21 provided inside the first protruding wall 9a and is formed by a semiconductor layer 2b and a source metal layer 3c which will be described below. In the active matrix substrate 20a, each pixel electrode 6 forms a pixel P, a minimum unit of an image, and the pixels P are arranged in a matrix pattern to form a display region.

As shown in FIGS. 1 and 2, the TFT 5 includes a gate electrode 1aa that is a laterally protruding portion of the gate line 1a provided on an insulating substrate 10a, a gate insulating film 11 provided so as to cover the gate electrode 1aa, a semiconductor layer 2a provided in an island shape at a position corresponding to the gate electrode 1aa on the gate insulating film 11, and a source electrode 3a and a drain electrode 3b which are provided so as to face each other on the semiconductor layer 2a. The source electrode 3a is a laterally protruding portion of the source line 3. The drain electrode 3b is connected to the pixel electrode 6 through a contact hole 12a formed in a protective insulating film 12, and is extended to a region where the capacitor line 1b is provided in the middle of the pixel P to form a capacitor electrode. The capacitor electrode forms an auxiliary capacitor together with the capacitor line 1b and the gate insulating film 11.

The active matrix substrate 20a has a multilayer structure in which the gate insulating film 11, the protective insulating film 12, and an alignment film 18a are sequentially formed on the insulating substrate 10a.

The gate line 1a, the gate electrode 1aa, and the capacitor line 1b are provided between the insulating substrate 10a and the gate insulating film 11.

The semiconductor layers 2a and 2b are provided between the gate insulating film 11 and the protective insulating film 12. The source line 3, the source electrode 3a, and the drain electrode 3b are provided on the semiconductor layer 2a, and the source metal layer 3c is provided on the semiconductor layer 2b.

The pixel electrodes 6 are provided between the protective insulating film 12 and the alignment film 18a.

The counter substrate 30a has a multilayer structure in which a color filter layer 16, an overcoat layer (not shown), a common electrode 17, and an alignment film 18b are sequentially formed on an insulating substrate 10b.

The color filter layer 16 includes colored layers 16a provided respectively corresponding to the pixels P and each having one of red, green, and blue colors, and a black matrix 16b provided between the colored layers 16a as a light-shielding film.

Projections (not shown) serving as an alignment center of the liquid crystal layer 25 and second protruding walls 19b each overlapping the respective first protruding wall 9a and surrounding the corresponding spacer 21 are provided between the common electrode 17 and the alignment film 18b.

When no voltage is applied to the liquid crystal layer 25, liquid crystal molecules in a nematic liquid crystal material have a negative dielectric anisotropy ($\Delta\epsilon<0$) so that the liquid crystal molecules are oriented substantially vertically to the substrate surface.

The spacers 21 are made of beads such as plastic, silica or the like.

The liquid crystal display device 50a having the above structure operates as follows: when the TFT 5 of each pixel P is turned on in response to a gate signal supplied through the gate line 1a, a source signal is supplied from the source line 3 and predetermined charges are written to the pixel electrode 6 through the source electrode 3a and the drain electrode 3b. As a result, a potential difference is produced between the pixel electrode 6 and the common electrode 17 and a predetermined voltage is applied to a liquid crystal capacitor of the liquid crystal layer 25. The liquid crystal display device 50a displays an image by adjusting the transmittance of incident light applied from outside by using the fact that the orientation state of the liquid crystal molecules changes according to the magnitude of an applied voltage.

Hereinafter, a method for manufacturing the liquid crystal display device 50a of the present embodiment will be described with reference to FIGS. 1 and 2. The manufacturing method of the present embodiment includes an active matrix substrate fabrication process, a counter substrate fabrication process, and a liquid crystal display panel fabrication process.

(Active Matrix Substrate Fabrication Process)

First, a metal film such as titanium is formed with a thickness of about 3,000 Å on the whole surface of an insulating substrate 10a such as a glass substrate by a sputtering method The metal film is then patterned by a photolithography technology (Photo Engraving Process; hereinafter, referred to as "PEP technology") to form gate lines 1a, gate electrodes 1aa, and capacitor lines 1b.

Next, a silicon nitride film or the like is formed with a thickness of about 3,000 Å by a CVD (Chemical Vapor Deposition) method over the whole substrate having the gate lines 1a, the gate electrodes 1aa, and the capacitor lines 1b formed thereon to form a gate insulating film 11.

An intrinsic amorphous silicon film (thickness: about 1,500 Å) and a phosphorus-doped n+ amorphous silicon film (thickness; about 500 Å) are sequentially formed by a CVD method over the whole substrate having the gate insulating film 11 formed thereon. The intrinsic amorphous silicon film and the phosphorus-doped n+ amorphous silicon film are then patterned into an island shape on the gate electrodes 1aa and into a rectangular frame shape on the gate lines 1a by a PEP technology to form semiconductor layers 2a and 2b made of the intrinsic amorphous silicon layer and the n+ amorphous silicon layer.

A metal film such as titanium is then formed with a thickness of about 3,000 Å by a sputtering method over the whole substrate having the gate insulating film 11 and the semiconductor layers 2a and 2b formed thereon. The metal film is then patterned by a PEP technology to form source lines 3, source electrodes 3a, drain electrodes 3b, and a source metal layer 3c. First protruding walls 9a made of the semiconductor layer 2b and the source metal layer 3c are thus formed.

The n+ amorphous silicon layer of the semiconductor layer 2a is then removed by etching by using the source electrodes 3a and the drain electrodes 3b as a mask, whereby channel portions are formed. The TFTs 5 are thus formed.

A silicon nitride film or the like is then formed with a thickness of about 3,000 Å by a CVD method over the whole substrate having the TFTs 5 formed thereon. Contact holes 2a are then respectively patterned on the drain electrodes 3b by a PEP technology. A protective insulating film 12 is thus formed.

An ITO (Indium Tin Oxide) film, a compound of indium oxide and tin oxide, is then formed with a thickness of about 1,500 Å by a sputtering method over the whole substrate having the protective insulating film 12 formed thereon. The ITO film is then patterned by a PEP technology to form pixel electrodes 6.

Finally, a polyimide resin is applied by an inkjet method to the whole substrate having the pixel electrodes 6 formed thereon. A rubbing process is then performed to form an alignment film 18a.

The active matrix substrate 20a can thus be fabricated.

Note that the semiconductor layer 2a is made of an amorphous silicon film in the above description of the fabrication process of the active matrix substrate 20a. However, the semiconductor layer 2a may be made of a polysilicon film. The amorphous silicon layer and the polysilicon film may be subjected to a laser annealing process in order to improve crystallinity.

(Counter Substrate Fabrication Process)

First, a black-colored photoresist is formed with a thickness of about 2 μm on the whole surface of an insulating substrate 10b such as a glass substrate. The photoresist is then patterned by a PEP technology to form a black matrix 16b.

A red, green, or blue-colored photoresist is then formed with a thickness of about 1.8 μm between the black matrices 16b. The photoresist is then patterned by a PEP technology to form colored layers 16a. A color filter 16 comprised of the colored layers 16a and the black matrix 16b is thus formed.

An acrylic resin is then applied to the whole substrate having the color filter 16 formed thereon to form an overcoat layer.

An ITO film is then formed with a thickness of about 1,000 Å over the whole substrate having the overcoat layer formed thereon to form a common electrode 17.

A photosensitive acrylic resin or the like is then applied to the whole substrate having the common electrode 17 thereon. The photosensitive acrylic resin is patterned by a PEP technology to form second protruding walls 19b and projections.

Finally, a polyimide resin is applied by an inkjet method to the whole substrate having the second protruding walls 19b and the projections formed thereon. A rubbing process is then performed to form an alignment film 18b.

A counter substrate 30a can thus be fabricated.

(Liquid Crystal Display Panel Fabrication Process)

First, for example, an ultraviolet-curable and thermosetting seal material is printed in a rectangular frame shape by screen printing or the like so as to surround, for example, a display region of the active matrix substrate 20a fabricated in the active matrix substrate fabrication process.

By an inkjet method, spacers 21 (average particle size: about 2.8 μm) are then provided, for example, inside the first protruding walls 9a formed over the surface of the active matrix substrate 20a having the seal material printed thereon.

A liquid crystal material is then dropped on, for example, the display region of the active matrix substrate 20a having the spacers 21 provided thereon. The active matrix substrate 20a having the liquid crystal material dropped thereon and the counter substrate 30a fabricated by the counter substrate fabrication process are then aligned and bonded to each other in a vacuum chamber.

Finally, ultraviolet rays are applied to the seal material between the bonded substrates 20a and 30a to pre-cure the seal material. The pre-cured seal material is then cured by heating, whereby the liquid crystal layer 25 is formed.

The liquid crystal display device 50a of the present embodiment can thus be manufactured.

As has been described above, according to the liquid crystal display device 50a of the present embodiment, the spherical spacers 21 provided between the active matrix substrate 20a and the counter substrate 30a are surrounded by the first protruding wall 9a formed over each gate line 1a of the active matrix substrate 20a and the second protruding wall 19b formed on the counter substrate 30a. This structure can prevent the spacers 21 from dropping from the gate lines (seats) 1a of the active matrix substrate 20a even if vibration is applied to the liquid crystal display device 50a. Moreover, since the spacers 21 are provided in a region surrounded by the first protruding wall 9a formed over each gate line 1a of the active matrix substrate 20a and the second protruding wall 19b formed on the counter substrate 30a, the spacers 21 can be reliably provided at a predetermined position between the active matrix substrate 20a and the counter substrate 30a. A region where the spacers 21 can move is thus limited, whereby the thickness of the liquid crystal layer 25 can be held at a predetermined value. The spacers 21 can thus be reliably provided at a predetermined position between the substrates, and non-uniformity of the cell thickness can be suppressed.

Moreover, according to the liquid crystal display device 50a of the present embodiment, the first protruding wall 9a and the second protruding wall 19b are provided so as to overlap each other. Therefore, the first protruding wall 9a and the second protruding wall 19b have the same shape so as to surround the spacers 21. Since movement of the spacers 21 can be restrained by respective inner peripheral walls of the first protruding wall 9a and the second protruding wall 19b, the spacers 21 can be reliably arranged at a predetermined position between the active matrix substrate 20a and the counter substrate 30a.

According to the liquid crystal display device 50a of the present embodiment, the first protruding wall 9a and the second protruding wall 19b are provided in every pixel P. The thickness of the liquid crystal layer 25 is therefore held at a predetermined value in every pixel P, and non-uniformity of the cell thickness can further be suppressed. Note that the first protruding wall 9a and the second protruding wall 19b are provided in every pixel P in the above description of the present embodiment. In the present invention, however, the first protruding wall and the second protruding wall need not necessarily be provided in every pixel. The first protruding wall and the second protruding wall may be provided in every plurality of pixels.

According to the liquid crystal display device 50a of the present embodiment, the first protruding wall 9a is made of the source metal layer 3c that forms the source lines 3 and the semiconductor layer 2b that forms the TFTs 5. The first protruding wall 9a can therefore be formed on each gate line 1a of the active matrix substrate 20a without adding any manufacturing steps. Note that, in the present embodiment, the first protruding wall 9a is made of the source metal layer 3c and the semiconductor layer 2b. In the present invention, however, the first protruding wall may be made of at least one of the source metal layer and the semiconductor layer. The first protruding wall may be made of a material other than the source metal layer and the semiconductor layer. Note that the semiconductor layer 2b may be at least one of the intrinsic amorphous silicon layer and the n+ amorphous silicon layer.

According to the liquid crystal display device 50a of the present embodiment, the second protruding wall 19b is made of a material of the projections serving as an alignment center of the liquid crystal layer 25. The second protruding wall 19b can therefore be formed on the counter substrate 30a without adding any manufacturing steps.

Note that, in the above description of the present embodiment, both substrates are bonded to each other after the spacers 21 are provided inside the first protruding walls 9a on the active matrix substrate 20a. In the present invention, however, the substrates may be bonded to each other after the spacers 21 are provided inside the second protruding walls 19b on the counter substrate 30a.

(Second Embodiment)

FIGS. 3 through 7 show a second embodiment of a liquid crystal display device according to the present invention. Note that, in the following embodiments, the same parts as those of FIGS. 1 and 2 are denoted with the same reference numerals and characters and detailed description thereof will be omitted.

In the first embodiment, the first protruding wall 9a and the second protruding wall 19b are a rectangular-frame-shaped continuous pattern. The first protruding wall and the second protruding wall of the present embodiment, on the other hand, include a movement restraining portion for restraining movement of the spacers 21 and a material inlet/outlet portion for introducing and discharging a liquid crystal material described below. Note that the liquid crystal display device of the present embodiment is substantially the same in structure as the liquid crystal display device 50a of the first embodiment except the first protruding wall and the second protruding wall. In the present embodiment, the second protruding wall is not shown in FIGS. 3 through 7. However, the second protruding wall of the present embodiment has approximately the same shape as that of each of first protruding walls 9b through 9e.

Figure 3:
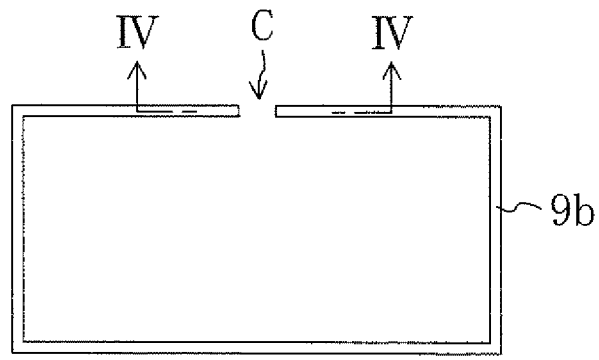
FIG. 3 is a schematic plan view showing a first protruding wall 9b of an active matrix substrate according to a second embodiment.
Figure 4:
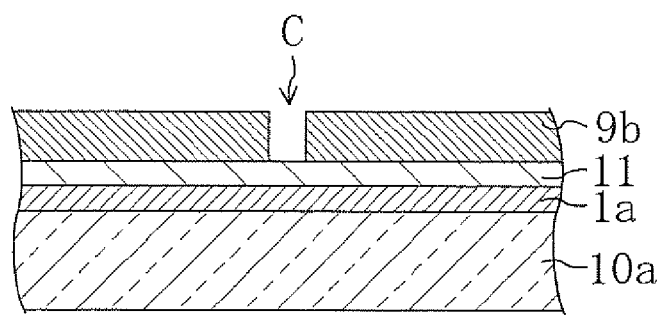
FIG. 4 is a schematic cross-sectional view showing the first protruding wall 9b taken along line IV-IV in FIG. 3.
Figure 5:
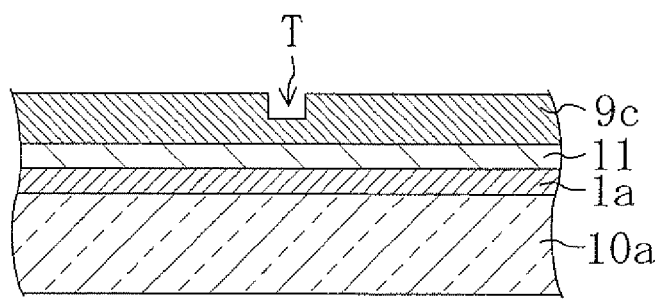
FIG. 5 is a schematic cross-sectional view showing a first protruding wall 9c of a modification.
Figure 6:
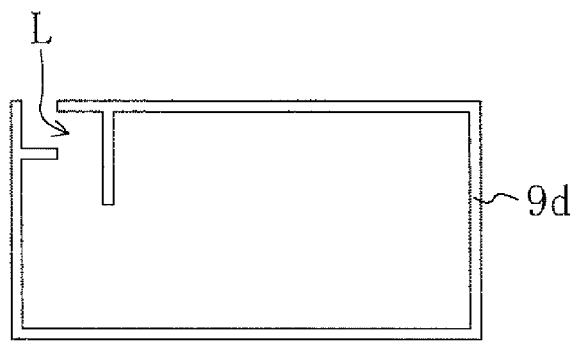
FIG. 6 is a schematic plan view showing a first protruding wall 9d of a modification.
Figure 7:
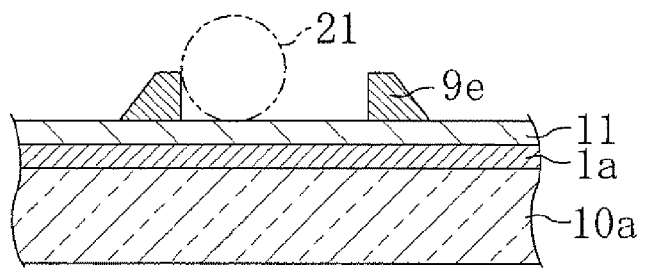
FIG. 7 is a schematic cross-sectional view showing a first protruding wall 9e of a modification.

FIG. 3 is a schematic plan view showing a first protruding wall 9b of an active matrix substrate in the liquid crystal display device of the present embodiment. FIG. 4 is a schematic cross-sectional view of the first protruding wall 9b taken along line IV-IV in FIG. 3.

As shown in FIGS. 3 and 4, the first protruding wall 9b has a notch portion C formed along the circumferential direction of the first protruding wall 9b. The first protruding wall 9b itself functions as a movement restraining portion and the notch portion C functions as a material inlet/outlet portion. As shown in a first protruding wall 9c of FIG. 5, instead of the notch portion C, the material inlet/outlet portion may be a thinned portion T having a lower height than that of the movement restraining portion. As shown in a first protruding wall 9d of FIG. 6, the material inlet/outlet portion may alternatively be a material inlet/outlet path L formed by a partially protruding movement restraining portion. Note that the first protruding walls 9b through 9d can be formed by merely changing the pattern shape used to form the first protruding wall 9a described in the first embodiment. The second protruding wall of the counter substrate can also be formed by merely changing the pattern shape used to form the second protruding wall 19b described in the first embodiment.

According to the active matrix substrate having the first protruding wall 9b, 9c or 9d of the present embodiment, the counter substrate having the second protruding wall, and the liquid crystal display device having the active matrix substrate and the counter substrate, the notch portion C, the thinned portion T, or the material inlet/outlet path L is provided as the material inlet/outlet portion. Therefore, in addition to the effects described in the first embodiment, an alignment-film forming resin such as a polyimide resin applied by an inkjet method and a dropped liquid crystal material can be spread to the first protruding wall 9b, 9c, 9d and the second protruding wall and a region around the first and second protruding walls through the material inlet/outlet portion.

In the first protruding wall 9d, the shape of the slit (the material inlet/outlet path L) is more complicated than that of the slit (the notch portion C) of the first protruding wall 9b. The spacers 21 provided inside the first protruding wall 9d are less likely to drop to the outside.

Note that, in each of the above embodiments, the first protruding walls 9a through 9d have an approximately rectangular transverse section. As shown in a first protruding wall 9e of FIG. 7, however, an inner wall surface may stand perpendicularly to the substrate surface, and an outer wall surface may be tapered toward the inner wall surface from the substrate surface side. Since the inner wall surface of the first protruding wall 9e stands perpendicularly to the substrate surface, the spherical spacers 21 are less likely to flow over the first protruding wall 9e. Movement of the spacers 21 to the outside of the first protruding wall 9e can thus be restrained. Moreover, since the outer wall surface of the first protruding wall 9e is tilted toward the inner wall surface from the substrate surface side, a liquid material such as an alignment-film forming resin and a liquid crystal material is more likely to flow into the inside of the first protruding wall 9e over the first protruding wall 9e.

(Third Embodiment)

Figure 8:
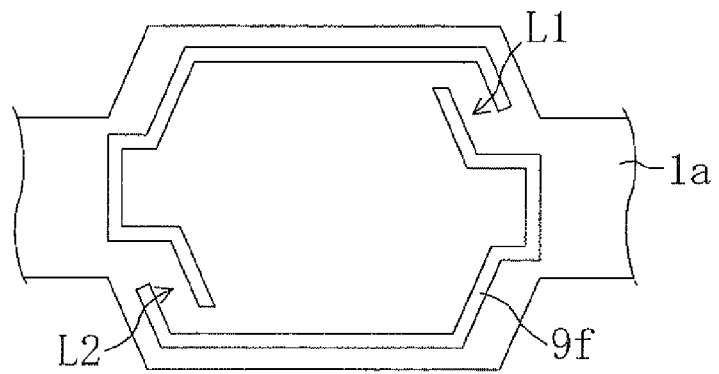
FIG. 8 is a schematic plan view showing a gate line 1a and a first protruding wall 9f of an active matrix substrate according to a third embodiment.

FIG. 8 shows a third embodiment of the liquid crystal display device according to the present invention. More specifically, FIG. 8 is a schematic plan view showing a gate line 1a and a first protruding wall 9f of an active matrix substrate of the liquid crystal display device according to the present embodiment. Note that, although a second protruding wall of the present embodiment is not shown in FIG. 8, the second protruding wall of the present embodiment has the same shape as that of the first protruding wall 9.

In the active matrix substrate of the liquid crystal display device of the present embodiment, as shown in FIG. 8, a part of each gate line 1a has a wider width than the remaining part of the gate line 1a, and the first protruding wall 9f is formed along the peripheral end of the wider part of the gate line 1a. More specifically, the gate line 1a has a line width of about 45 µm at the intersection with the source line 3 and the wider part of the gate line 1a has a size of about 100 µm by about 120 µm. The pitch of the gate lines 1a is about 530 µm. The source line 3 (not shown in FIG. 8) has a line width of about 10 µm and the pitch of the source lines 3 is about 180 µm. As shown in FIG. 8, the first protruding wall 9f has a bent shape and material inlet/outlet paths L1 and L2 are formed at both ends of the first protruding wall 9f.

According to the active matrix substrate having the first protruding wall 9f of the present embodiment, the counter substrate having the second protruding wall, and the liquid crystal display device including the active matrix substrate and the counter substrate, each gate line 1a has a wider width in a region where the spacers 21 are provided, and the first protruding wall 9f (and the second protruding wall) for surrounding the spacers 21 is therefore formed with a larger size. Accordingly, in addition to the effects described in the first and second embodiments, the spacers 21 can be easily provided inside the first protruding wall 9f (and the second protruding wall). Especially when the spacers 21 are provided by an inkjet method, a printing head (nozzle) for ejecting a dispersion having the spacers 21 dispersed therein ejects the dispersion while being moved along a horizontal direction (X direction or Y direction). Since the arrangement accuracy of the spacers 21 is relatively low (e.g., about ±20 µm) in this method, forming such a large first protruding wall 9f (and the second protruding wall) enables the spacers 21 to be reliably provided inside the first protruding wall 9f (and the second protruding wall).

(Fourth Embodiment)

Figure 9:
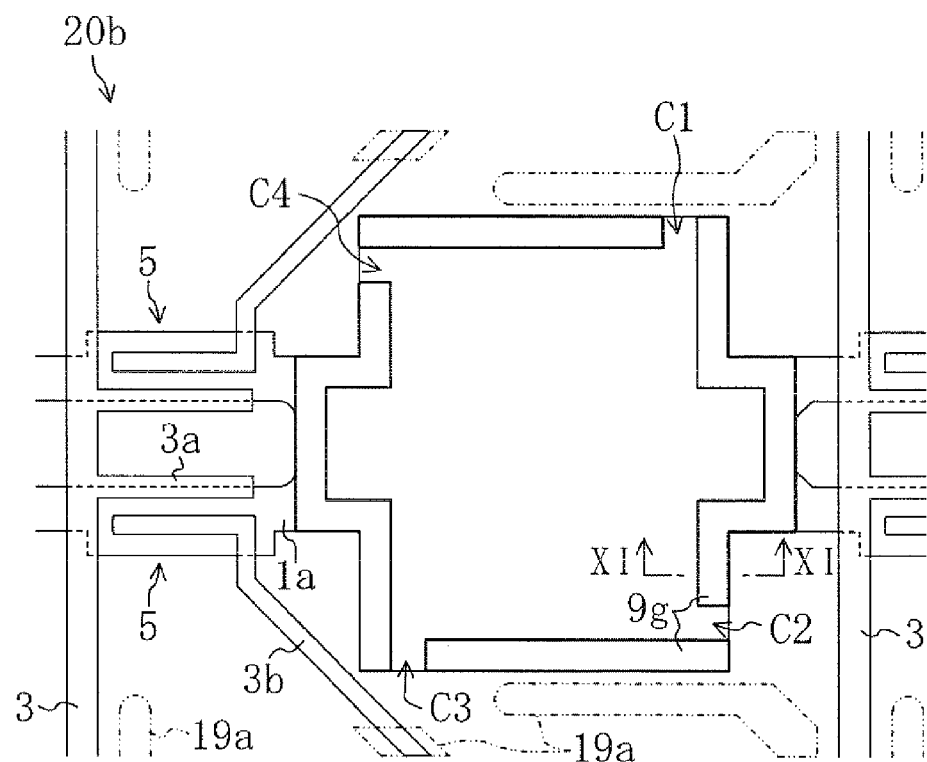
FIG. 9 is a schematic plan view showing an active matrix substrate 20b according to a fourth embodiment.
Figure 10:
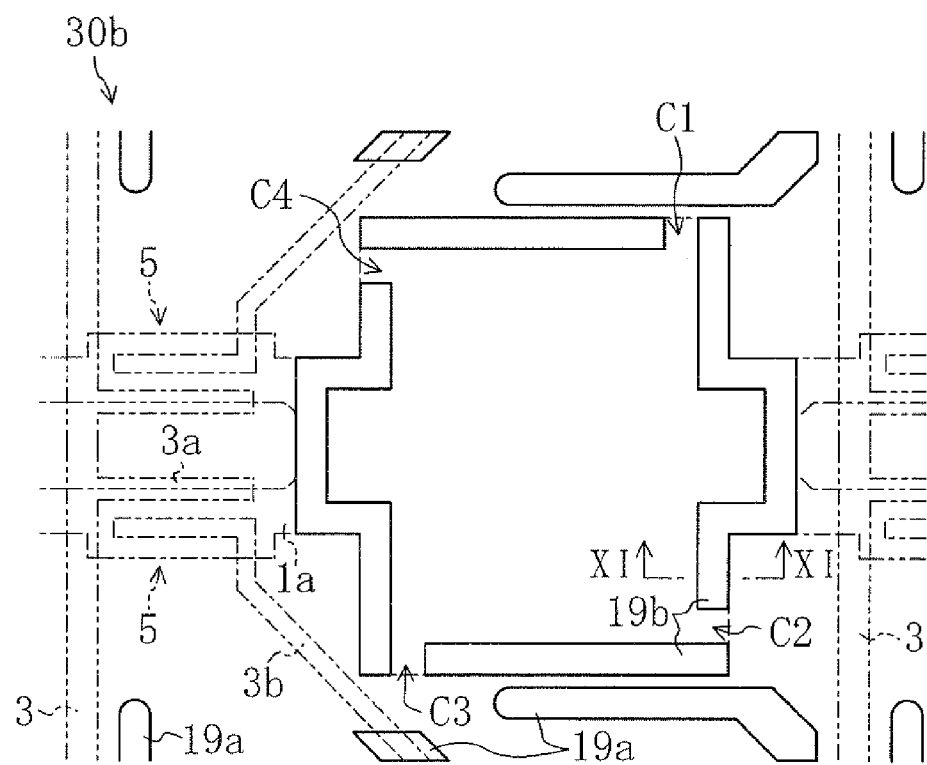
FIG. 10 is a schematic plan view showing a counter substrate 30b according to the fourth embodiment.
Figure 11:
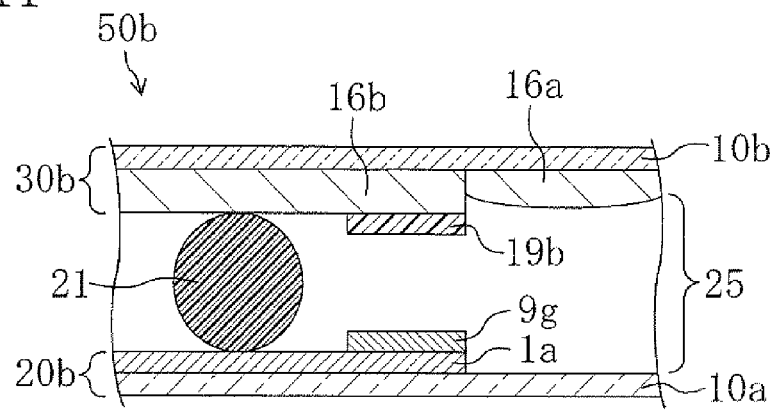
FIG. 11 is a schematic cross-sectional view showing a liquid crystal display device 50b taken along line XI-XI in FIGS. 9 and 10.

FIGS. 9 through 11 show a fourth embodiment of the liquid crystal display device according to the present invention. More specifically, FIG. 9 is a schematic plan view showing an active matrix substrate 20b of the liquid crystal display device according to the present embodiment. FIG. 10 is a schematic plan view showing a counter substrate 30b of the liquid crystal display device according to the present embodiment. FIG. 11 is a schematic cross-sectional view of a liquid crystal display device 50b taken along line XI-XI in FIGS. 9 and 10. Note that, in FIGS. 9 through 11, elements are shown in a simplified manner. For example, pixel electrodes are not shown in the figures.

As shown in FIG. 11, the liquid crystal display device 50b includes an active matrix substrate 20b and a counter substrate 30b which are arranged so as to face each other, a vertical alignment type liquid crystal layer 25 provided between the active matrix substrate 20b and the counter substrate 30b, and spherical spacers 21 provided between the active matrix substrate 20b and the counter substrate 30b for defining the thickness of the liquid crystal layer 25. Note that, in FIG. 11, the particle size of the spacers 21, the thickness of a first protruding wall 9g, and the thickness of a second protruding wall 19b are, for example, 2.8 µm, 0.5 µm, and 1.2 µm, respectively.

As shown in FIG. 9, in the active matrix substrate 20b, each gate line 1a has a wider part as in the third embodiment, and is branched into two at the intersection with each source line 3. In the active matrix substrate 20b, each branched part of the gate line 1a serves as a gate electrode of a corresponding TFT 5. Two TFTs 5 are therefore formed in every pixel P. In the active matrix substrate 20*b*, a first protruding wall 9*g* divided by notch portions C1 through C4 is formed along the peripheral end of the wider part of each gate line 1*a*.

As shown in FIG. 10, the counter substrate 30*b* has projections 19*a* serving as an alignment center of the liquid crystal layer 25, and second protruding walls 19*b* each provided so as to overlap the corresponding first protruding wall 9*g* of the active matrix substrate 20*b*.

Like the liquid crystal display device 50*a* of the first embodiment, when no voltage is applied to the liquid crystal layer 25 of the liquid crystal display device 50*b*, liquid crystal molecules are oriented substantially vertically to the substrate surface. When a voltage is applied to the liquid crystal layer 25, the liquid crystal molecules are oriented in all directions centered on the projections 19*a* so as to be substantially in parallel with the substrate surface. As a result, a wide viewing angle and fast response can be achieved.

According to the liquid crystal display device 50*b* of the present embodiment, the first protruding wall 9*g* is divided into four portions. Therefore, the following effect can be obtained in addition to the effects described in the first to third embodiments: even if the conductive first protruding wall 9*g* and, for example, the source line 3 of an adjacent pixel are short-circuited due to adhesion of a conductive foreign matter or the like, the influence on display quality caused by the short-circuit can be reduced.

(Fifth Embodiment)

Figure 12:
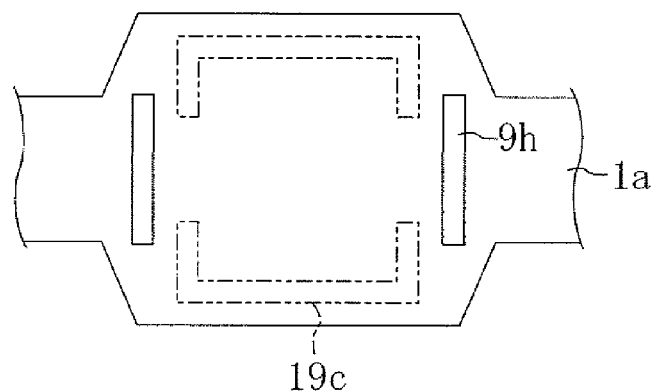
FIG. 12 is a schematic plan view showing a gate line 1a, a first protruding wall 9h, and a second protruding wall 19c of a liquid crystal display device according to a fifth embodiment.
Figure 13:
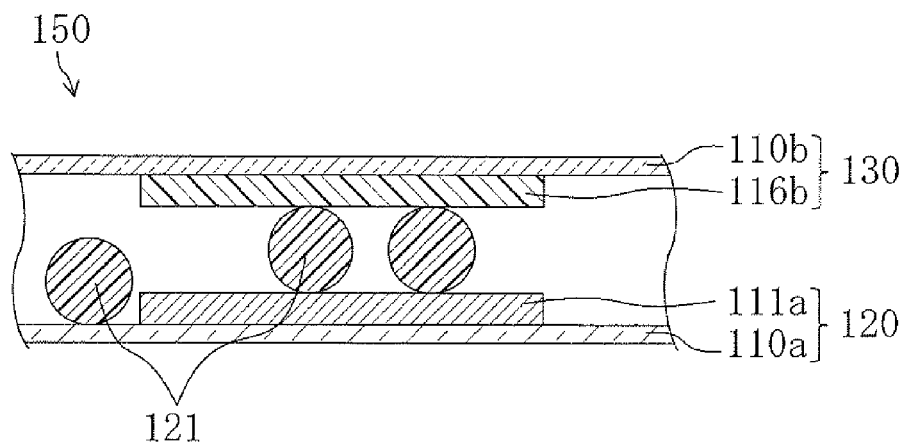
FIG. 13 is a schematic cross-sectional view of a conventional liquid crystal display device 150.

In the description of the liquid crystal display devices of the above embodiments, the first protruding wall and the second protruding wall have the same shape. In a liquid crystal display device of the present embodiment, on the other hand, a first protruding wall 9*h* and a second protruding wall 19*c* have different shapes from each other as shown in FIG. 12. More specifically, the first protruding wall 9*h* and the second protruding wall 19*c* are provided without overlapping each other. The first protruding wall 9*h* is thus continuously provided when viewed two-dimensionally so as to surround the spacers 21 through the second protruding wall 19*c*. Movement of the spacers 21 is therefore restrained by an inner wall of at least one of the first protruding wall 9*h* and the second protruding wall 19*c*, whereby the spacers 21 can be reliably provided at a predetermined position between the active matrix substrate and the counter substrate.

Moreover, a liquid material can be introduced into and discharged from the first protruding wall 9*h*, the second protruding wall 19*c*, and a region around the first and second protruding walls 9*h*, 19*c* in an improved manner because there are less protruding walls than in the liquid crystal display devices of the above embodiments. Accordingly, an alignment-film forming resin such as a polyimide resin applied by an inkjet method and a dropped liquid crystal material can be easily spread to the first protruding wall 9*h* and the second protruding wall 19*c* and a region around the first and second protruding walls 9*h*, 19*c*.

Note that the liquid crystal display device having the first protruding wall 9*a* to 9*g* and the second protruding wall on each gate line 1*a* is described in each of the above embodiments. In the present invention, however, the first protruding wall and the second protruding wall may be formed on each source line 3 or each capacitor line 1*b* by, for example, using another material or the like.

Industrial Applicability

As has been described above, the present invention is capable of implementing high display quality in a liquid crystal display device that is manufactured by an inkjet method. The present invention is therefore useful for large screen liquid crystal televisions and the like.

The invention claimed is:

1. A liquid crystal display device, comprising:
   an active matrix substrate having a plurality of display lines extending in parallel with each other;
   a counter substrate provided so as to face the active matrix substrate;
   a liquid crystal layer provided between the active matrix substrate and the counter substrate;
   spherical spacers provided between the active matrix substrate and the counter substrate so as to overlap each display line, for defining a thickness of the liquid crystal layer, wherein
   a first protruding wall for surrounding the spacers is provided over each display line of the active matrix substrate,
   a second protruding wall for surrounding the spacers is provided on the counter substrate, and
   wherein the counter substrate comprises a color filter layer and a common electrode, wherein the common electrode is located closer to the liquid crystal layer than is the color filter layer, and wherein the second protruding wall on the counter substrate is located between at least the common electrode of the counter substrate and an alignment layer of the counter substrate so that the second protruding wall is located closer to the liquid crystal layer than is the color filter layer.

2. The liquid crystal display device according to claim 1, wherein the first protruding wall and the second protruding wall overlap each other so as to surround the spacers.

3. The liquid crystal display device according to claim 1, wherein the first protruding wall and the second protruding wall are provided so as to surround the spacers without overlapping each other.

4. The liquid crystal display device according to claim 1, comprising a plurality of pixels arranged in a matrix pattern, wherein each of the display lines extends between the pixels, and the first protruding wall and the second protruding wall are provided in every pixel.

5. The liquid crystal display device according to claim 1, wherein each of the display lines has a wider width in a region where the spacers are provided.

6. The liquid crystal display device according to claim 5, wherein the spacers are inkjet printed.

7. The liquid crystal display device according to claim 1, wherein the display lines are gate lines, the liquid crystal display device further comprising a plurality of source lines extending in parallel with each other in such a direction that crosses the gate lines, wherein a thin film transistor is provided at each intersection of the gate lines and the source lines, and the first protruding wall includes at least one of a metal layer that forms the source lines and a semiconductor layer that forms the thin film transistors.

8. The liquid crystal display device according to claim 1, wherein projections serving as an alignment center of the liquid crystal layer are provided in the counter substrate, and the second protruding wall is made of a material that forms the projections.

9. The liquid crystal display device according to claim 2, wherein
   the first protruding wall and the second protruding wall include a movement restraining portion for restraining movement of the spacers and a material inlet/outlet portion for introducing and discharging a liquid material, and the second protruding wall includes a movement restraining portion for restraining movement of the spacers and a material inlet/outlet portion for introducing and discharging a liquid material.

10. The liquid crystal display device according to claim 9, wherein in each of the first and second protruding walls the material inlet/outlet portion has a lower height than that of the movement restraining portion.

11. The liquid crystal display device according to claim 9, wherein in each of the first and second protruding walls at least part of the material inlet/outlet portion is a notch portion formed along a circumferential direction of each protruding wall.

12. The liquid crystal display device according to claim 9, wherein
in each of the first and second protruding walls, the material inlet/outlet portion is a material inlet/outlet path formed by bending or protruding of the movement restraining portion in a direction along a substrate surface.

13. The liquid crystal display device according to claim 9, wherein the liquid material is an alignment-film forming resin that is supplied by an inkjet method in order to form an alignment film on respective surfaces of the active matrix substrate and the counter substrate.

14. The liquid crystal display device according to claim 9, wherein the liquid material is a liquid crystal material that forms the liquid crystal layer.

15. The liquid crystal display device according to claim 1, wherein at least one of the first protruding wall and the second protruding wall has an inner wall surface standing perpendicularly to a substrate surface and an outer wall surface tilted toward the inner wall surface from the substrate surface side.

* * * * *